(12) United States Patent
Bohn

(10) Patent No.: US 9,715,078 B2
(45) Date of Patent: Jul. 25, 2017

(54) ADJUSTABLE LENS MOUNT

(71) Applicant: Microsoft Technology Licensing, LLC, Redmond, WA (US)

(72) Inventor: David Douglas Bohn, Fort Collins, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/712,814

(22) Filed: May 14, 2015

(65) Prior Publication Data

US 2016/0334597 A1    Nov. 17, 2016

(51) Int. Cl.
*H04N 5/225* (2006.01)
*G02B 7/02* (2006.01)
(Continued)

(52) U.S. Cl.
CPC ............. *G02B 7/023* (2013.01); *G02B 7/004* (2013.01); *G02B 7/005* (2013.01); *G02B 7/025* (2013.01); *G03B 5/00* (2013.01); *G03B 5/06* (2013.01); *G03B 17/12* (2013.01); *H04N 5/2252* (2013.01); *H04N 5/2253* (2013.01); *H04N 5/2254* (2013.01); *G03B 2205/0023* (2013.01)

(58) Field of Classification Search
None
See application file for complete search history.

(56) References Cited

U.S. PATENT DOCUMENTS 5,270,534 A * 12/1993 Huiberts .................. H05G 1/64
250/208.1
5,995,758 A    11/1999 Tyler
(Continued)

FOREIGN PATENT DOCUMENTS

EP    2863624 A2    4/2015
FR    2660080 A1    9/1991
(Continued)

OTHER PUBLICATIONS

Huang, Jun-Lung, "Image Sensor Advanced Package Solution", In Proceedings of Semicon Taiwan, Sep. 4, 2013, 24 pages.
(Continued)

*Primary Examiner* — Roberto Velez
*Assistant Examiner* — Quan Pham
(74) *Attorney, Agent, or Firm* — Alleman Hall Creasman & Tuttle LLP

(57) ABSTRACT

Examples are disclosed herein that relate to a lens mount for aligning a lens relative to an image sensor in a camera module. One example provides a lens mount comprising a first housing having a first tiltable joint structure and a first receptacle, and a second housing having a second tiltable joint structure complementary to the first tiltable joint structure and also having a second receptacle, wherein the first receptacle and the second receptacle are configured to accommodate a lens holder when the first housing and the second housing are joined by the first tiltable joint structure and the second tiltable joint structure, and wherein the first housing and the second housing are configured to permit the lens holder to be tiltably adjustable when the lens holder is positioned within the first receptacle and the second receptacle.

18 Claims, 5 Drawing Sheets

(51) Int. Cl.
*G02B 7/00* (2006.01)
*G03B 5/00* (2006.01)
*G03B 5/06* (2006.01)
*G03B 17/12* (2006.01)

(56) References Cited

U.S. PATENT DOCUMENTS

| | | |
|---|---|---|
| 7,064,789 B1 | 6/2006 | Shono |
| 7,436,435 B2 | 10/2008 | Wada |
| 7,593,636 B2 | 9/2009 | Nystrom et al. |
| 8,379,089 B2 | 2/2013 | Lee |
| 8,559,802 B1 | 10/2013 | McClatchie et al. |
| 8,792,044 B2 | 7/2014 | Imai et al. |
| 2001/0050899 A1 | 12/2001 | Ito et al. |
| 2003/0057426 A1 | 3/2003 | Miyazaki et al. |
| 2003/0171649 A1* | 9/2003 | Yokoi ............... A61B 1/04 600/109 |
| 2005/0275741 A1 | 12/2005 | Watanabe et al. |
| 2005/0285973 A1* | 12/2005 | Singh ............ H01L 27/14618 348/374 |
| 2006/0055787 A1 | 3/2006 | Hirota et al. |
| 2008/0285968 A1 | 11/2008 | Chang et al. |
| 2008/0316350 A1* | 12/2008 | Gottwald ........ H01L 27/14618 348/340 |
| 2009/0128684 A1* | 5/2009 | Apel ............... H01L 27/14618 348/360 |
| 2012/0169920 A1 | 7/2012 | Mukai |
| 2012/0249815 A1 | 10/2012 | Bohn et al. |
| 2013/0050571 A1 | 2/2013 | Tam |
| 2013/0162894 A1* | 6/2013 | Lee ....................... H04N 5/225 348/373 |
| 2013/0180658 A1 | 7/2013 | Shin et al. |
| 2013/0299081 A1 | 11/2013 | Kim et al. |
| 2015/0174715 A1* | 6/2015 | Kang ................. B23P 19/105 29/407.04 |
| 2015/0264240 A1* | 9/2015 | Chan ..................... G02B 7/102 348/208.7 |
| 2016/0006909 A1* | 1/2016 | Jao ....................... H04N 5/2257 348/373 |
| 2016/0097912 A1* | 4/2016 | Kobori ................ H04N 5/2254 359/820 |

FOREIGN PATENT DOCUMENTS

| | | |
|---|---|---|
| WO | 2009136679 A1 | 11/2009 |
| WO | 2014003281 A1 | 1/2014 |

OTHER PUBLICATIONS

"Active Alignment and Adhesive Attach", Published on: Oct. 8, 2012, Available at: http://www.kasalis.com/active_alignment.html.
ISA European Patent Office, International Search Report and Written Opinion Issued in PCT Application No. PCT/US2016/028188, Jun. 27, 2016, WIPO, 11 pages.
IPEA European Patent Office, Second Written Opinion Issued in PCT Application No. PCT/US2016/028188, Dec. 16, 2016, WIPO, 5 pages.
IPEA European Patent Office, International Preliminary Report on Patentability Issued in PCT Application No. PCT/US2016/028188, Mar. 13, 2017, WIPO, 6 pages.

* cited by examiner

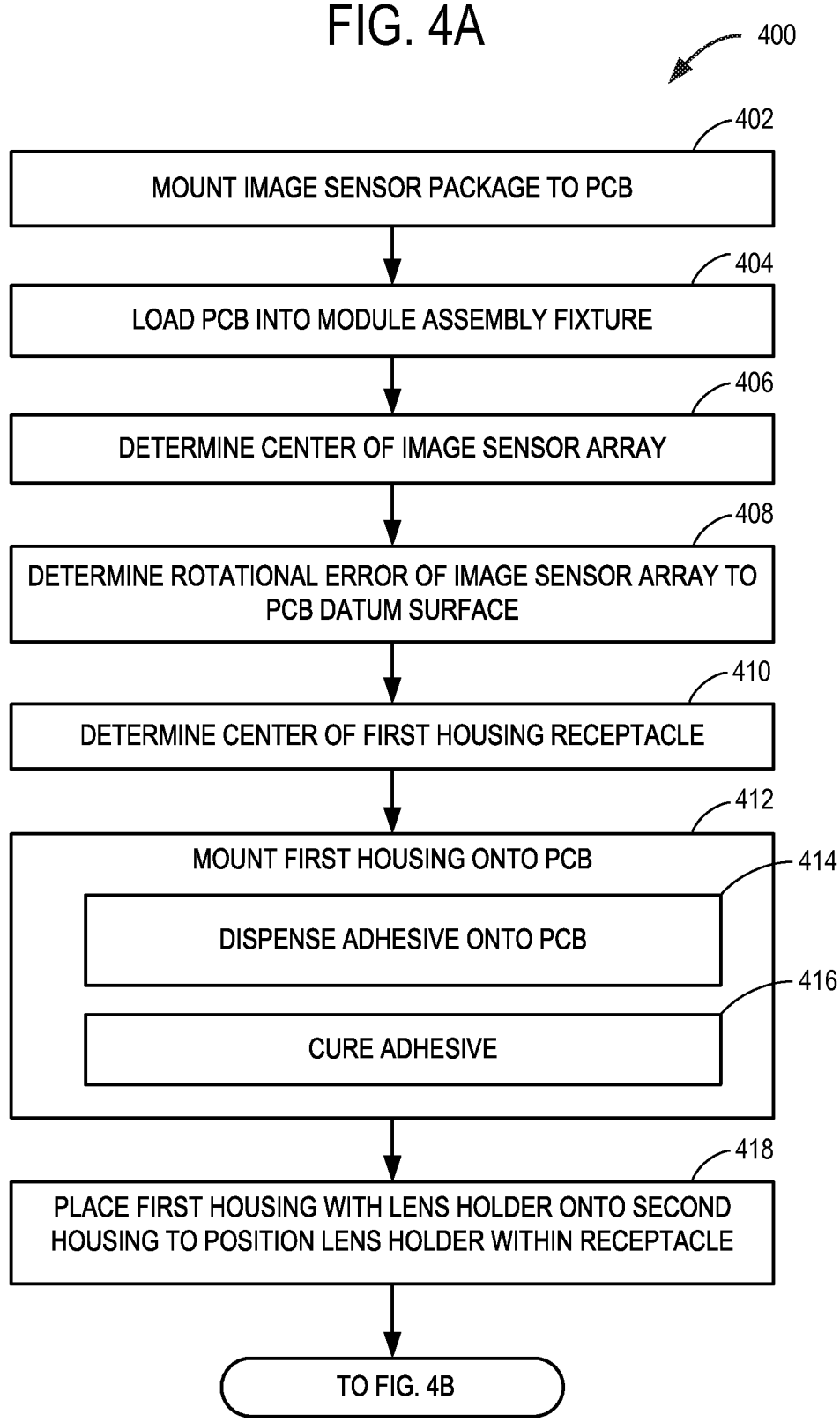

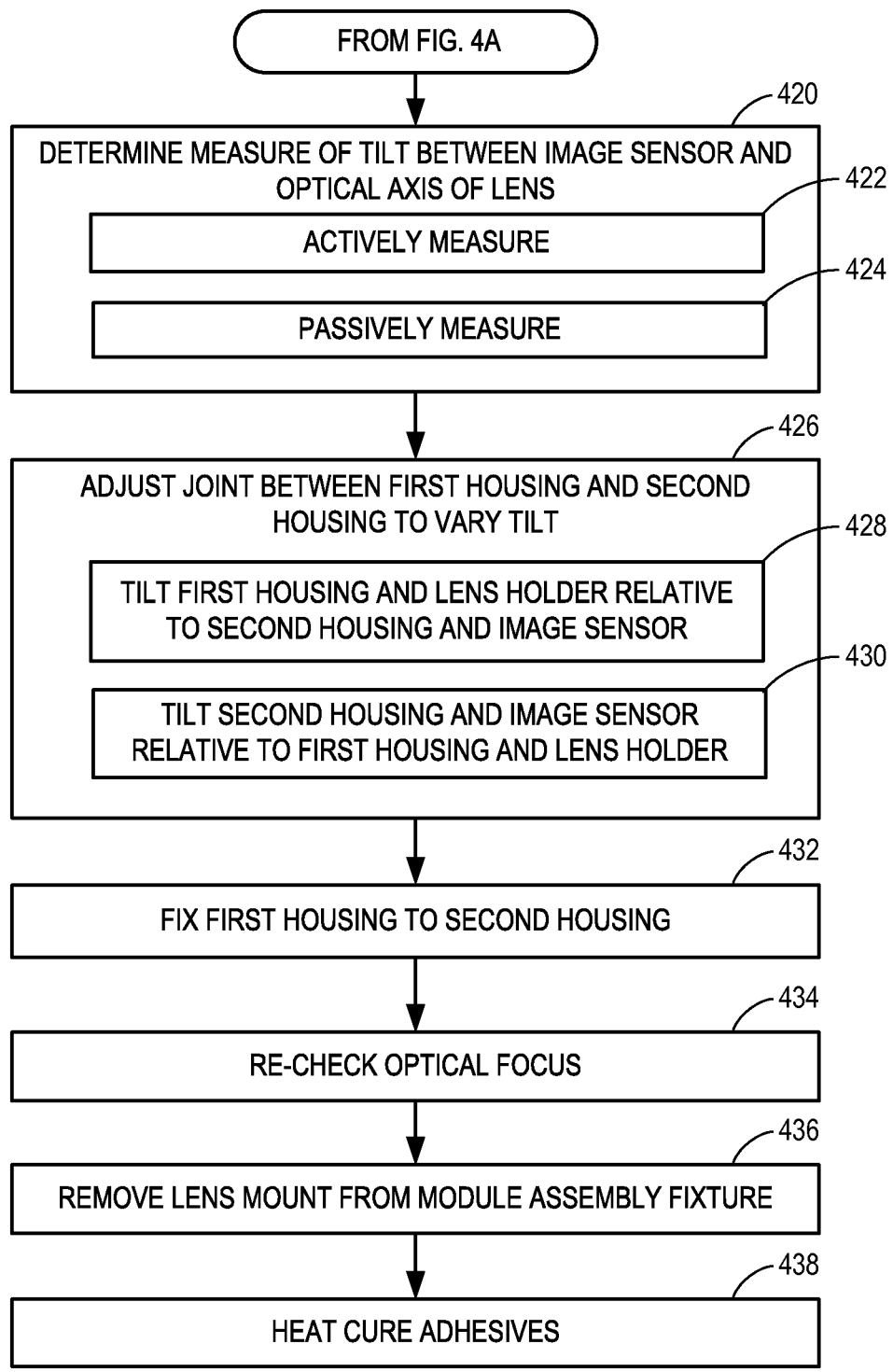

ADJUSTABLE LENS MOUNT

BACKGROUND

An image sensor may be mounted to a sensor package, such as a ceramic leadless chip carrier (CLCC), for incorporation into an imaging device. In an imaging device, a lens holder that holds one or more lenses for focusing an image onto an image sensor may be mounted to the same circuit board as the image sensor.

SUMMARY

Examples are disclosed that relate to aligning a lens relative to an image sensor in an imaging system. One example provides a lens mount comprising a first housing having a first tiltable joint structure and a first receptacle, and a second housing having a second tiltable joint structure complementary to the first tiltable joint structure and also having a second receptacle, wherein the first receptacle and the second receptacle are configured to accommodate a lens holder when the first housing and the second housing are joined by the first tiltable joint structure and the second tiltable joint structure. Further, the first housing and the second housing are configured to permit the lens holder to be tiltably adjustable via the first tiltable joint structure and the second tiltable joint structure when the lens holder is positioned within the first receptacle and the second receptacle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B show a flow diagram illustrating an example method of aligning a lens to an image sensor in an optical system via a lens mount.

DETAILED DESCRIPTION

Figure 1:
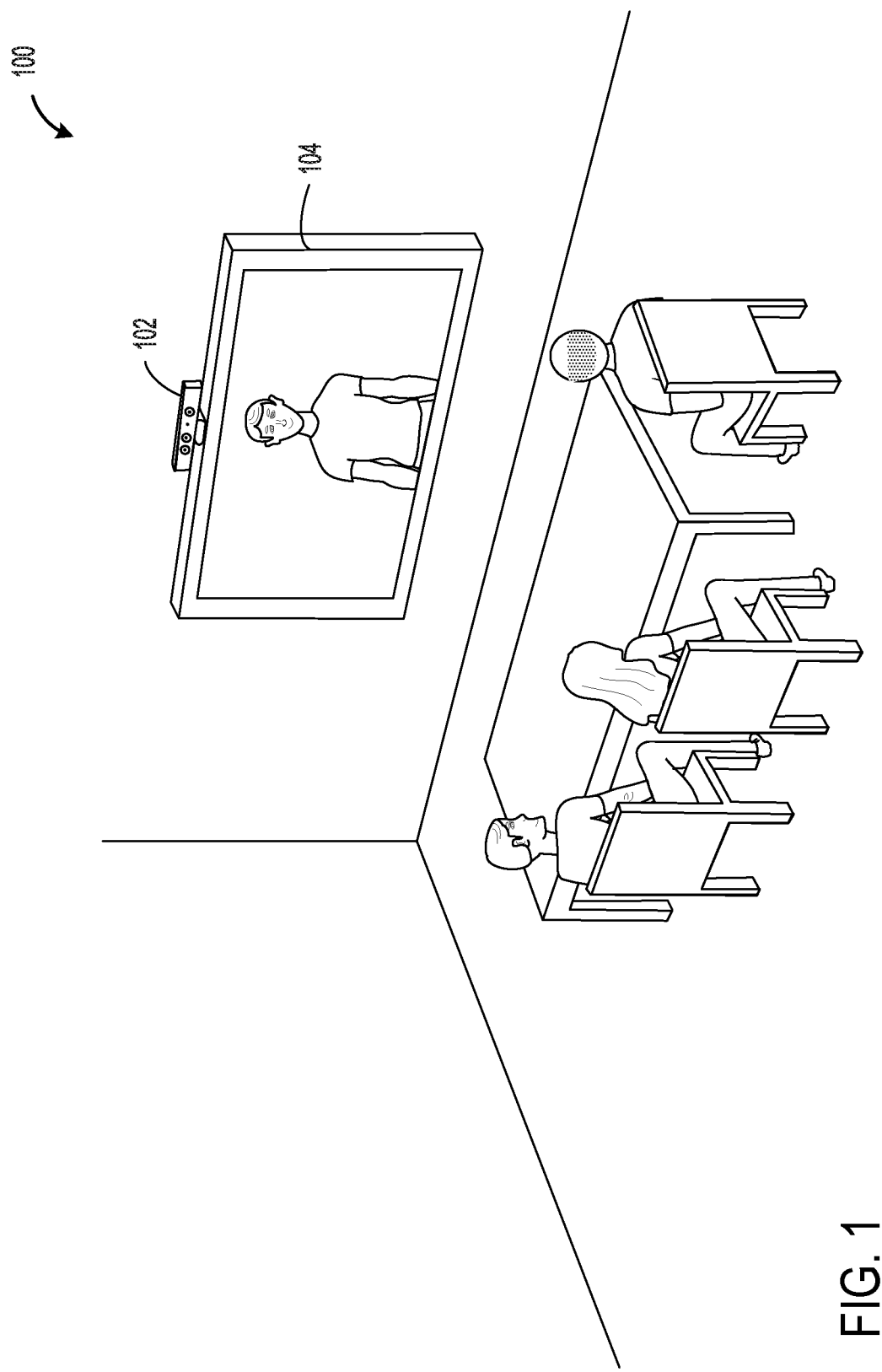
FIG. 1 shows a use scenario for an example optical system.

In optical imaging devices, imaging performance may depend upon a degree of tilt between an optical axis of a lens (or lenses) that focus an image on an image sensor and the sensor surface normal. Relatively larger degrees of tilt may be acceptable when using relatively smaller image sensors (with reference to an area of the sensor surface), as the entire area of the tilted sensor may fall within a depth of focus of the imaging lens or lenses. However, imaging devices using larger area image sensors (e.g. 4K image sensors) may not tolerate as much tilt, as such tilt may result in portions of the image sensor not being located within the depth of focus of the focusing lens, resulting in portions of an image appearing blurry.

Tilt may arise from various sources. For example, where the image sensor is mounted to a sensor package (e.g. a ceramic leadless chip container), a plane of the image sensor may not be parallel to a datum plane of the sensor package due to bonding processes used to bond the image sensor to the sensor package. As other examples, the mounting of the sensor package to the printed circuit board may introduce tilt, the printed circuit board itself may not be completely flat, and/or a lens holder containing the lens may have a mechanical axis that is not parallel to the optical axis of the contained lens.

To help ensure good image quality, lens alignment may be performed during assembly of an imaging device to help lessen any tilt between an optical axis of an imaging lens and the surface of the image sensor. Some lens alignment methods may involve tilting a lens holder containing the lens to correct the alignment, and then fixing the lens holder in the tilted position. However, this may result in a non-uniform thickness of the bond between the lens holder and printed circuit board. Such non-uniform bond thickness may result in a mechanically weak structure. Further, thermal expansion of the non-uniform bond may introduce a temperature-dependent tilt error between the optical axis and the image sensor. Such issues may be exacerbated in camera modules with relatively large image sensor arrays, as relatively larger area image sensors may be more sensitive to slight errors in tilt compared to relatively smaller image sensors, as mentioned above.

Accordingly, example lens mounts and mounting methods are described herein that may help to compensate for tilt between the lens and the image sensor while maintaining a substantially uniform bond thickness between the lens mount and the printed circuit board and/or other bonded joints. Briefly, the disclosed example lens mounts include a first housing having a first tiltable joint structure, and a second housing having a second tiltable joint structure complementary to the first tiltable joint structure. The first housing and the second housing are configured to enable a lens holder to be tiltably adjusted when the lens holder is positioned within the first housing and the second housing by moving the first and second housing relative to one another to compensate for tilt. Once a suitable position is found, the first and second tiltable joint structures may be bonded together with a bond of substantially uniform thickness to avoid reintroducing tilt via thermal expansion of the bond. This also enables a bond of substantially uniform thickness to be used to join the lens mount to the circuit board, again without reintroducing undesired temperature-dependent tilt.

Prior to discussing these examples, an example use scenario 100 is described with reference to FIG. 1, which shows an example optical system 102. The optical system 102 takes the form of a meeting room conferencing device 104 that streams image data (e.g. a video feed) acquired by the optical system 102 to remote meeting participants, and displays image data (e.g. a remotely acquired video feed) to local meeting participants. In some examples, the optical system 102 may use a large area image sensor (e.g. a 4K sensor) for high resolution imaging. It will be understood that the scenario of FIG. 1 is provided as an example and is not intended to be limiting in any way, as the lens mount according to the present disclosure may be used in any other suitable cameras and applications.

Figure 2:
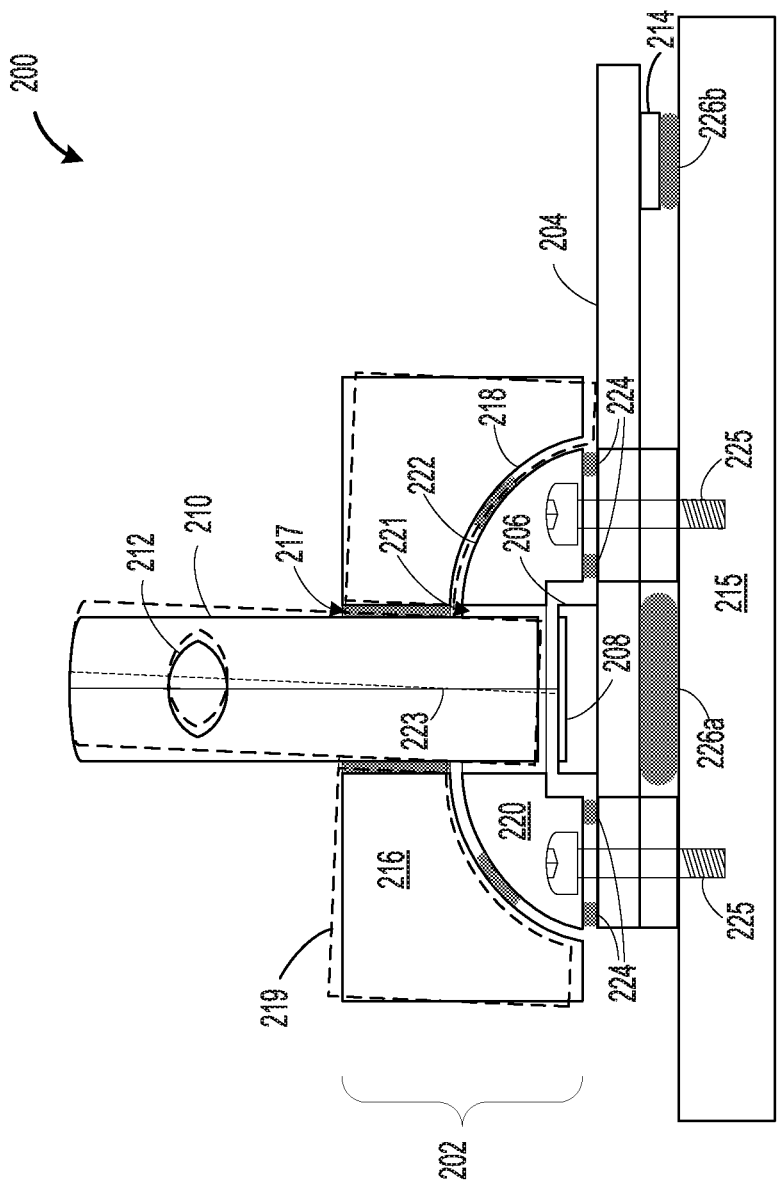
FIG. 2 shows an example lens mount in an optical system.

As mentioned above, large area image sensors may suffer noticeable performance issues where tilt between the optical axis of a lens system and an image sensor surface exceeds tolerance ranges, as the tilt may result in one or more portions of the image sensor being outside of the depth of focus of the lens system. Thus, FIG. 2 illustrates an example optical system 200 having an adjustable lens mount 202 configured to allow this tilt to be reduced during device assembly while maintaining substantially uniform bond thicknesses. The optical system 200 also includes a printed circuit board 204, a sensor package 206 containing an image sensor 208 mounted on the printed circuit board 204, and a lens holder 210 holding one or more lenses (represented schematically at 212) for focusing images onto the image sensor 208. The image sensor 208 may be any suitable type of image sensor, including but not limited to a high resolution sensor (e.g. a 4K image sensor having a horizontal resolution of 4,000 or more pixels). The sensor package 206 may include any suitable surface mount technology package, including but not limited to a CLCC. The optical system 200 further includes an image signal processor 214 and an optical bench 215 to which the printed circuit board 204 and the lens mount 202 are mounted.

The lens mount 202 is configured to enable adjustment of a tilt of the lens system 212 relative to the image sensor 208 during device assembly while maintaining substantially uniform bond thicknesses (e.g. that does not introduce unsuitable amounts of temperature-dependent tilt) between the lens mount 202 and the printed circuit board 204. As such, the lens mount 202 includes a first housing 216, and also a second housing 220 mounted to the printed circuit board (PCB) 204. The first housing 216 and second housing 220 each includes a receptacle, shown respectively at 217 and 221, to accommodate the lens holder. Also, the first housing 216 comprises a tiltable joint structure 218, and the second housing 220 comprises a complementary tiltable joint structure 222. In the depicted example, the tiltable joint structures 218 and 222 take the respective forms of complementary spherically curved concave and convex surfaces that form a spherical joint. This allows the lens holder 210, bonded within the receptacle 217 of the first housing 216, to be tiltably adjusted in x and y tilt directions relative to the image sensor 208 during assembly of the optical system 200 to align an optical axis 223 with the image sensor 208. An example tilt of the first housing 216 and the lens holder 210 is represented schematically at 219. It will be understood that the illustrated tilt may be exaggerated for the purpose of illustration, and the illustrated components of the optical system 200 may not be to scale.

Once the lens has been aligned with the image sensor, the positions of the first and second housings may be fixed relative to one another via the use of an adhesive within the spherical joint. Due to the spherical configuration of the joint, an adhesive of substantially uniform thickness may be used to bond the first housing to the second housing regardless of the relative rotations of the first and second housings. Likewise, the lens mount 202 may be bonded to the PCB 204 with bonds 224 of substantially uniform thickness. This may help to provide for mechanical and thermal stability of the bond and help to avoid temperature-dependent tilt, as described above. Example methods of adjusting the joint between the first housing 216 and second housing 220 are described in more detail below.

The lens holder 210 may be bonded within the receptacle 217 of the first housing 216 in any suitable manner, such as via adhesives, gaskets, seals, etc. In some implementations, the lens holder 210 may be bonded within the receptacle of the first housing 216 prior to placing the first housing 216 on the second housing 220. This may facilitate tilt adjustment during device assembly.

In the example of FIG. 2, the second housing 220 is adhered to the printed circuit board 204 and fixed to the optical bench 215 via bolts 225. Further, the printed circuit board 204 is thermally coupled to the optical bench 215 via thermal putty joints 226a and 226b. In this configuration, the printed circuit board 204 remains generally parallel to the optical bench, which may help to maintain a substantially uniform thickness of the thermal putty joints 226a and 226b, and thus provide substantially uniform heat transfer through each joint. However, as the lens system 212 may not be orthogonal to the optical bench 215 after tilt adjustment, the lens system 212 may comprise a larger front window opening for tolerance stacks.

Figure 3:
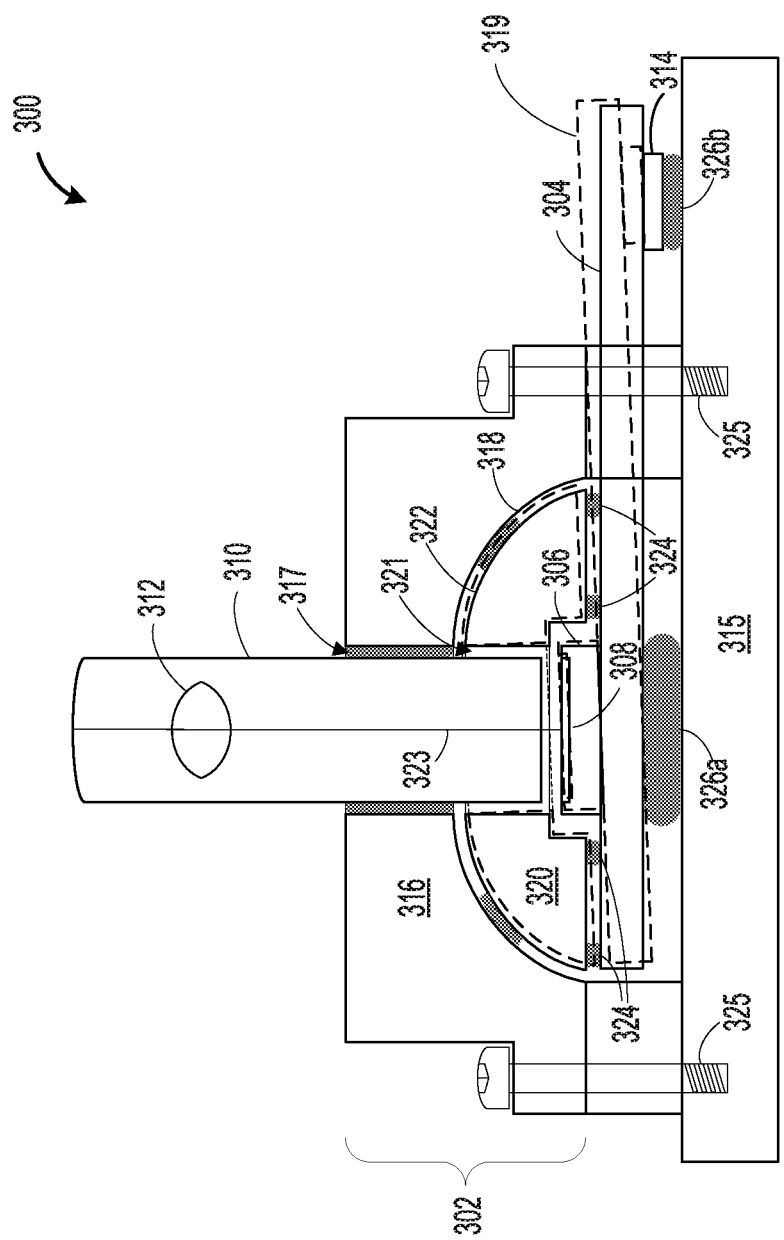
FIG. 3 shows another example lens mount in an optical system.

In the example of FIG. 2, the lens holder is tiltably adjustable relative to the sensor. In other implementations, the sensor may be tiltably adjustable relative to the lens holder. FIG. 3 shows an example optical system 300 and a lens mount 302 that allows a sensor tilt to be adjusted relative to a lens system. The optical system 300 includes a PCB 304, a sensor package 306 containing an image sensor 308 mounted on the PCB 304, a lens holder 310 including one or more lenses 312 for focusing images onto the image sensor 308, an image signal processor 314, and an optical bench 315.

The lens mount 302 includes a first housing 316 having a receptacle 317, and also a second housing 320 having a receptacle 321, each receptacle being configured to accommodate the lens holder 310. The first housing 316 includes a tiltable joint structure 318, and the second housing 320 includes a complementary tiltable joint structure 322, which take the respective forms of complementary concave and convex surfaces forming a spherical joint. However, unlike the example of FIG. 2, the spherical joint allows the PCB 304 to be tiltably adjusted in x and y tilt directions relative to the lens holder 310. Thus, the second housing 320 moves relative to the first housing 316 during adjustment to align an optical axis 323 with the image sensor 308. A tilted configuration of the second housing 320 and the PCB 304 is represented schematically at 319.

The optical system 300 allows substantially uniform bond thicknesses (e.g. thicknesses sufficiently uniform as to not introduce unacceptable amounts of temperature-dependent tilt) to be maintained between the first housing 316 and second housing 320, and between the second housing 320 and the PCB 304, as illustrated via bonds 324. In contrast to the optical system 200 of FIG. 2, the first housing 316 is fixed to the optical bench 315 (e.g. via bolts 325) such that the second housing 320 is tilted relative to the first housing 316 and the optical bench 315 during assembly. As such, the lens system 312 remains fixed in a substantially orthogonal relation to the optical bench 315. This may help to reduce any field-of-view pointing error, and also may help to ensure alignment of the lens assembly to other subsystems. The term substantially orthogonal relative to the optical bench may include deviations from orthogonal that are sufficiently small to avoid field-of-view pointing errors outside of acceptable tolerances. On the other hand, as the printed circuit board 304 may not be parallel to the optical bench 315, this may lead to somewhat non-uniform heat transfer between thermal putty joints 326a and 326b. However, other parameters may be adjusted to compensate for such non-uniform heat transfer, if needed.

It will be understood that the lens mount housings and the spherical joint in the examples of FIG. 2 and FIG. 3 are shown for the purpose for example, and that any other suitable housing shapes and joint configurations may be used. As another non-limiting example, the tiltable joint structures may take the form of cylindrical surfaces, or any other suitable joint structures that allow movements in at least the x and y tilt directions. In the instance of cylindrical joints, two orthogonally-oriented cylindrical joints may be used to adjust tilt in x and y directions. The resulting joint may have a center of rotation that lies in the plane of the image sensor and aligns with the center of the image sensor (within any applicable tolerances) to avoid introducing an image displacement via adjustment of the joint.

FIGS. 4A-4B show an example method 400 for assembling an optical device utilizing a lens mount including a first housing and a second housing that are tiltably adjustable with respect to each other. Method 400 includes, at 402, mounting an image sensor package containing an image sensor to a PCB. The sensor package may take any suitable form, including but not limited to a surface mount package such as a CLCC. Further, any suitable image sensor may be used, including but not limited to a 4K image sensor or other large area sensor array. Method 400 further may include, at 404, loading the PCB into a camera module assembly fixture. The camera module assembly fixture may hold the PCB and/or lens holder during tilt adjustment, and include systems to allow tilt of a lens relative to the image sensor to be measured and adjusted on a fine scale during device assembly. Such a fixture may have any suitable configuration.

Method 400 further includes, at 406, determining a location of a center of the image sensor array, e.g. via optical measurement or other suitable method. Further, method 400 may include determining a rotational error of the image sensor array to a datum surface of the PCB, at 408. This rotational error represents the tilt of the image sensor relative to the sensor package.

Method 400 further includes, at 410, determining a center of the lens holder receptacle in the second housing, and at 412, mounting the second housing onto the PCB at a location based upon the determined center of the lens holder receptacle and the determined center of the image sensor. The second housing may be mounted on the PCB in any suitable manner For example, at shown at 414, an amount of adhesive having a substantially uniform thickness may be dispensed on the PCB in locations at which the first housing interfaces the PCB. As described above, the use of a bond of substantially uniform thickness may help to provide for optomechanical and thermal stability of the lens mount by preventing the introduction of temperature-dependent tilt of the lens optical axis relative to the image sensor. Any suitable adhesive may be used, including but not limited to thermally curable and/or ultraviolet light-curable adhesives. Method 400 further includes, at 416, curing the adhesive to fix the first housing into position on the PCB.

Next, method 400 includes, at 418, placing the first housing and lens holder (which are bonded together as a unit) onto the second housing. This positions the lens holder within the receptacle of the second housing.

Continuing with FIG. 4B, method 400 further includes, at 420, determining a measure of a tilt between an image sensor and an optical axis of the lens or lenses contained in the lens holder. The measure of tilt may be determined in any suitable manner. In some examples, the tilt may be actively measured, as indicated at 422. Active measurement may utilize the output of the image sensor to monitor image quality as an indication of tilt, as excessive tilt of the optical axis of the lens relative to the plane of the image sensor may result in parts of an image appearing to be out of focus. Additionally or alternatively, method 400 may include, at 424, passively measuring the tilt. Passive measurement refers to measurement the use of mechanisms other than the image sensor to monitor the tilt of the image sensor relative to the optical axis of the lens.

Method 400 further includes, at 426, adjusting the joint connecting the first and second housings to vary the tilt of the optical axis relative to the image sensor to lessen the tilt. This may include, for example, moving the first housing relative to the second housing (e.g. as in FIG. 2), as indicated at 428, or moving the second housing relative to the first housing (e.g. as in FIG. 3), as indicated at 430. Once any tilt between the optical axis of the lens and the image sensor surface has been reduced to a suitable amount, method 400 includes, at 432, fixing the first housing to the second housing, such as via an adhesive. Method 400 further includes, at 434, re-checking an optical focus of the camera module once the assembly is completed, and at 436, removing the lens mount from the module assembly fixture. Once removed from the fixture, method 400 may comprise, at 438, heat curing any thermally curable adhesives within the lens mount assembly. It will be understood that other steps may be performed than those shown, and/or that various steps may be omitted in various examples.

Another example provides a lens mount, comprising a first housing having a first tiltable joint structure and a first receptacle, and a second housing having a second tiltable joint structure complementary to the first tiltable joint structure and also having a second receptacle, wherein the first receptacle and the second receptacle are configured to accommodate a lens holder when the first housing and the second housing are joined by the first tiltable joint structure and the second tiltable joint structure, and wherein the first housing and the second housing are configured to permit the lens holder to be tiltably adjustable when the lens holder is positioned within the first receptacle and the second receptacle. Additionally or alternatively, the first tiltable joint structure may include a spherically curved concave surface and the second tiltable joint structure may include a complementary spherically curved convex surface. Additionally or alternatively, the second housing may be fixed to an optical bench, wherein the first housing is tilted relative to the optical bench and the second housing. Additionally or alternatively, the first housing may be fixed to an optical bench, wherein the second housing is tilted relative to the optical bench and the first housing. Additionally or alternatively, the first housing may be mounted to a printed circuit board, and the lens mount may include an adhesive between the first housing and the printed circuit board. The lens mount may additionally or alternatively include an image sensor, wherein the lens holder may include a lens system, and wherein the lens holder is configured to be tiltably adjustable to adjust a tilt of an optical axis of the lens system relative to the image sensor.

Another example provides an optical device, comprising a sensor package mounted to a printed circuit board, the sensor package comprising an image sensor, a lens holder comprising a lens system, and a lens mount mounted to the printed circuit board, the lens mount comprising a first housing and a second housing that define a joint therebetween, the first housing and the second housing each comprising a receptacle through which the lens holder at least partially extends, the lens holder being tilted by a relative position of the first housing to the second housing at the joint. In this example, the joint between the first housing and the second housing may additionally or alternatively include a spherical joint. Additionally or alternatively, the second housing may be fixed to an optical bench, wherein the first housing is tilted relative to the optical bench and the second housing. In this example, the lens system may be substantially orthogonal relative to the optical bench. Additionally or alternatively, the first housing may be fixed to an optical bench, wherein the second housing is tilted relative to the optical bench and the first housing. In this example, the printed circuit board may be parallel relative to the optical bench. Additionally or alternatively, the first housing may be mounted to the printed circuit board, and the optical device may include an adhesive between the first housing and the printed circuit board, wherein the adhesive comprises a substantially uniform bond thickness.

Another example provides a method, comprising determining a measure of a tilt between an image sensor and an optical axis of a lens system contained in a lens holder, adjusting a joint connecting a first housing and a second housing, through each of which the lens holder at least partially extends, to vary the tilt of the optical axis relative to a plane of the image sensor, lessening the tilt via adjusting the joint, and fixing the first housing and the second housing thereby maintaining the lessened tilt of the optical axis relative to the plane of the image sensor. The method may additionally or alternatively include determining the measure of the tilt by actively measuring the tilt. The method may additionally or alternatively include determining the measure of the tilt by passively measuring the tilt. The method may additionally or alternatively include fixing the first housing to an optical bench, and wherein the second housing is tilted relative to the optical bench and the first housing. The method may additionally or alternatively include fixing the second housing to an optical bench, and wherein the first housing is tilted relative to the optical bench and the second housing. The method may additionally or alternatively include mounting the first housing on a printed circuit board and dispensing an adhesive between the first housing and the printed circuit board, wherein the adhesive comprises a substantially uniform bond thickness. The method may additionally or alternatively include positioning the lens holder within a receptacle of each of the first housing and the second housing.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A lens mount, comprising:
   a first housing having a first tiltable joint structure and a first receptacle, the first tiltable joint structure comprising a spherically curved concave surface; and
   a second housing having a second tiltable joint structure complementary to the first tiltable joint structure and also having a second receptacle, the second tiltable joint structure comprising a complementary spherically curved convex surface, wherein the first receptacle and the second receptacle are configured to accommodate a lens holder when the first housing and the second housing are joined by the first tiltable joint structure and the second tiltable joint structure, and wherein the first housing and the second housing are configured to permit the lens holder to be tiltably adjustable relative to the second housing when the lens holder is positioned within the first receptacle and the second receptacle by tilting the first housing relative to the second housing or tilting the second housing relative to the first housing, the first housing or the second housing being configured to be mounted to a printed circuit board, and wherein the first housing and the second housing are configured to be fixed via an adhesive.

2. The lens mount of claim 1, wherein the second housing is fixed to an optical bench, and wherein the first housing is tilted relative to the optical bench and the second housing.

3. The lens mount of claim 1, wherein the first housing is fixed to an optical bench, and wherein the second housing is tilted relative to the optical bench and the first housing.

4. The lens mount of claim 1, wherein the second housing is mounted to the printed circuit board, and the lens mount further comprises an adhesive between the second housing and the printed circuit board.

5. The lens mount of claim 1, further comprising an image sensor, and wherein the lens holder comprises a lens system, and wherein the lens holder is configured to be tiltably adjustable to adjust a tilt of an optical axis of the lens system relative to the image sensor.

6. An optical device, comprising:
   a sensor package mounted to a printed circuit board, the sensor package comprising an image sensor;
   a lens holder comprising a lens system; and
   a lens mount mounted to the printed circuit board, the lens mount comprising a first housing and a second housing that define a spherical joint therebetween, the first housing and the second housing each comprising a receptacle through which the lens holder at least partially extends, the lens holder being tilted relative to the printed circuit board by a relative position of the first housing to the second housing at the spherical joint, the first housing or the second housing being mounted to the printed circuit board, and
   wherein the first housing and the second housing are fixed via an adhesive.

7. The optical device of claim 6, wherein the second housing is fixed to an optical bench, and wherein the first housing is tilted relative to the optical bench and the second housing.

8. The optical device of claim 7, wherein the lens system is substantially orthogonal relative to the optical bench.

9. The optical device of claim 6, wherein the first housing is fixed to an optical bench, and wherein the second housing is tilted relative to the optical bench and the first housing.

10. The optical device of claim 9, wherein the printed circuit board is parallel relative to the optical bench.

11. The optical device of claim 6, wherein the second housing is mounted to the printed circuit board, and the optical device further comprises an adhesive between the second housing and the printed circuit board, wherein the adhesive between the second housing and the printed circuit board comprises a substantially uniform bond thickness.

12. A method, comprising:
   determining a measure of a tilt between an image sensor and an optical axis of a lens system contained in a lens holder;
   adjusting a spherical joint connecting a first housing and a second housing, through each of which the lens holder at least partially extends, to vary the tilt of the optical axis relative to a plane of the image sensor;
   lessening the tilt via adjusting the spherical joint;

fixing the first housing and the second housing via an adhesive thereby maintaining the lessened tilt of the optical axis relative to the plane of the image sensor; and fixing the first housing or the second housing to an optical bench.

13. The method of claim 12, wherein determining the measure of the tilt comprises actively measuring the tilt.

14. The method of claim 12, wherein determining the measure of the tilt comprises passively measuring the tilt.

15. The method of claim 12, further comprising fixing the first housing to the optical bench, and wherein the second housing is tilted relative to the optical bench and the first housing.

16. The method of claim 12, further comprising fixing the second housing to the optical bench, and wherein the first housing is tilted relative to the optical bench and the second housing.

17. The method of claim 12, further comprising mounting the second housing on a printed circuit board and dispensing an adhesive between the second housing and the printed circuit board, wherein the adhesive between the second housing and the printed circuit board comprises a substantially uniform bond thickness.

18. The method of claim 12, further comprising positioning the lens holder within a receptacle of each of the first housing and the second housing.

\* \* \* \* \*